United States Patent [19]

Parrish et al.

[11] 3,808,462

[45] Apr. 30, 1974

[54] INVERTER INCORPORATING COMPLEMENTARY FIELD EFFECT TRANSISTORS

[75] Inventors: James T. Parrish, Carmel; Dominic P. Spampinato, Ozone Park; Lewis M. Terman, South Salem, all of N.Y.

[73] Assignee: International Business Machines Corporation, Armonk, N.Y.

[22] Filed: Nov. 29, 1972

[21] Appl. No.: 310,527

Related U.S. Application Data

[62] Division of Ser. No. 158,496, June 30, 1971, Pat. No. 3,716,724.

[52] U.S. Cl. .................. 307/225, 307/205, 307/251, 307/255, 307/221 C

[51] Int. Cl. .................. H03k 23/08

[58] Field of Search ........... 307/225, 214, 221, 251, 307/278, 304, 317, 205

[56] References Cited

UNITED STATES PATENTS

| | | | |
|---|---|---|---|
| 3,431,433 | 3/1969 | Ball | 307/221 |
| 3,588,528 | 6/1971 | Terman | 307/221 C |
| 3,588,527 | 6/1971 | Cricchi | 307/251 X |
| 2,910,597 | 10/1959 | Strong | 307/255 X |
| 3,322,974 | 5/1967 | Ahrons | 307/221 C |
| 3,454,785 | 7/1969 | Norman | 307/304 |
| 3,577,166 | 5/1971 | Yunc | 307/251 |
| 3,031,585 | 4/1962 | Frady | 307/317 |
| 3,130,326 | 4/1964 | Habisohn | 307/317 |

OTHER PUBLICATIONS

Froess, "Current Reversal in Inductive Loads" IBM Tech Disc. Bul., Vol. 11, No. 10, at 1365 March 69.

Whittaker, "A Simple Current Generator," Nuclear Instruments & Methods, 1966, pages 183–184.

*Primary Examiner*—Rudolph V. Rolinec
*Assistant Examiner*—R. E. Hart
*Attorney, Agent, or Firm*—Thomas J. Kilgannon, Jr.

[57] ABSTRACT

An inverter incorporating a pair of complementary field effect transistors and a pair of Schottky barrier diodes disposed in series with the complementary transistors is disclosed. The gates of the complementary transistors are connected in parallel to a pulsed source which provides positive and negative inputs to the inverter. First and second pulsed sources are connected to the inverter which, during an ENABLE cycle, provide voltages of opposite polarity to the inverter which, operating in a common source mode, charges an output to one of the source potentials. During a DISABLE cycle, the potential at the output is locked at a node by applying to the inverter potentials complementary to those initially applied to the inverter. A shift register stage consisting of the arrangement just described and an inverted inverter is also disclosed. When this shift register stage is actuated, during the ENABLE portion of a given cycle, one inverter is enabled while the other is disabled and, during the DISABLE portion of the given cycle, the other inverter is enabled while the first inverter is disabled. Also included are embodiments which are operable in a static mode as well as a cynamic mode.

11 Claims, 8 Drawing Figures

INVERTER INCORPORATING COMPLEMENTARY FIELD EFFECT TRANSISTORS

This is a division of application Ser. No. 158,496 filed June 30, 1971, now U.S. Pat. NO. 3,716,724.

BACKGROUND OF THE INVENTION

1. Field of the Invention

This invention relates generally to dynamic and static shift registers which have application in computer and data systems as memory or as temporary storage location for digital data awaiting use in following logic circuitry. More specifically, it relates to an inverter circuit useful in a shift register stage which is capable of storing data at its output node after an ENABLE-DISABLE cycle. Still more specifically, the inverter circuit is shown applied in both dynamic and static modes as stages of shift register circuits. The shift register stages are substantially faster and have less area requirements than known prior art shift registers which incorporate complementary field effect transistors in their inverter circuits.

2. Brief Description of the Prior Art

Field effect transistor inverters are well known in the field effect transistor art. Similarly, field effect transistor inverters incorporating complementary field effect transistor devices are also well known. A shift register of this character is disclosed in a paper given at the IEEE International Solid State Circuit Conference on Feb. 18, 1970 entitled "High Speed Silicon-on-Sapphire Fifty Stage Shift Register" by J. E. Meyer, J. R. Burns and J. H. Scott of RCA Laboratories. A shift register stage in the article includes two identical complementary transistor inverters the inputs of which are connected to the output of a preceding inverter by pairs of separately pulsed complementary transmission gates. By drastically reducing parasitic capacitance inherent in silicon-on-sapphire technology and providing complementary devices with desired electron and hole mobilities, a performance level equivalent to the highest speed bipolar circuits was achieved while retaining all of the other desirable circuit and processing features of MOS arrays. The use of complementary transmission gates, however, reduces speed and adds to the area requirements which, if substantially reduced, would enhance even more the desirable characteristics of such shift registers.

SUMMARY OF THE INVENTION

The present invention, in its broadest aspect, is directed to an inverter circuit having input and output terminals which comprises a pair of serially arranged complementary field effect transistors, the gates of which are connected to the input and a pair of unidirectional devices disposed in series with the field effect transistors. Means are connected to the inverter for applying at least first and second potentials to it to charge its output to either a first or second potential during a first portion of a given cycle and means are porvided for holding the output to one of the first and second potentials during a second portion of the given cycle.

In accordance with more specific aspects of the invention, an inverter is provided wherein the unidirectional devices are Schottky barrier diodes and wherein the means for applying at least first and second potentials to the inverter includes a pulsed source connected to the input which applies either a positive or negative signal to the input during the first portion of the given cycle. The latter means also includes first and second pulsed sources which apply positive and negative potentials or positive and/or negative and ground potentials to the inverter during the first portion of the given cycle; the first pulsed source applying a potential of opposite polarity to the second pulsed source at the same instant. Finally, the means for holding includes pulsed sources connected to the inverter which apply the complement of potentials applied during the first portion of the given cycle to the inverter during a second portion of the given cycle.

In accordance with still more specific aspects of the invention, a shift register stage is provided which includes first and second complementary inverter circuits each of which includes a pair of complementary field effect transistors the gates of which are connected in parallel In the shift register stage, the second inverter is reversed relative to the first inverter and the output of the first inverter is connected to the input of the second inverter. In addition to the field effect transistors, each inverter includes a pair of unidirectional devices disposed in series with the field effect transistors. Means connected to the first and second inverters for either enabling or disabling the inverters during a given cycle is provided; one of the inverters being enabled while the other is disabled. When either of the inverters is enabled the unidirectional devices thereof are in a conductive state.

In accordance with still more specific aspects of the present invention, further means connected to the first and second inverters are provided for maintaining statically the potentials at the input and output during a portion of the given cycle. Finally, a third complementary inverter identical with the first inverter and interposed between the first and second inverters is provided along with means interconnecting the output of the third inverter and the input of the first inverter to feed back the potential on the output of the third inverter to the input of the first inverter.

In operation, the inverter and shift register stages are all activated during a single ENABLE-DISABLE cycle. In the instance of the shift register stages, it has been recognized that by simply inverting the position of a second inverter between the phase lines that the ENABLE cycle for the first inverter is a DISABLE cycle for the second inverter and vice versa. Thus, once the ENABLE cycle for the first inverter is completed and the DISABLE cycle begun, information held at the output of the first inverter is utilized during the DISABLE portion of the cycle for the first inverter (which is the ENABLE cycle for the second inverter) to control the conduction or non-conduction of one of the complementary transistors of the second inverter during its ENABLE cycle. Operation in both the dynamic and static modes is accomplished relatively simply by using another inverter identical with the first inverter and a flexibility is provided in terms of both fabrication and operation which heretofore has not been available.

It is, therefor, an object of this invention to provide a complementary transistor shift register arrangement which is operable in both dynamic and static modes.

Another object is to provide a complementary inverter circuit operable during an ENABLE-DISABLE cycle which is capable of storing information at its output node.

Still another object is to provide a complementary field effect transistor shift register arrangement which is superior to prior art shift registers of similar character in that it has higher speed and reduced area requirements.

The foregoing and other objects, features and advantages of the present invention will be apparent from the following more particular description of a preferred embodiment of the invention as illustrated in the accompanying drawings.

DESCRIPTION OF PREFERRED EMBODIMENTS

Figure 1:
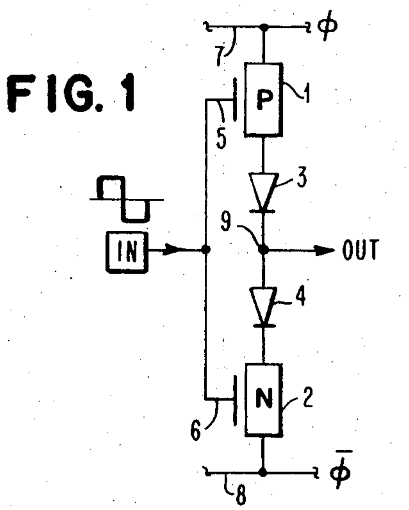
FIG. 1 is a schematic diagram of the complementary field effect transistor inverter of the present invention which incorporates two serially disposed diodes. The gate electrodes of the complementary transistors are connected in parallel to a pulsed source while the inverter itself is connected between pulsed sources which apply opposite polarity voltages across the inverter circuit.

Referring now to FIG. 1, there is shown therein a pair of complementary field effect transistors 1, 2, disposed in series with a pair of diodes 3, 4. Field effect transistor 1 is a P-channel enhancement mode device while field effect transistor 2 is an N-channel enhancement mode device. An enhancement mode device is one which is OFF or non-conducting with zero potential between its gate and source electrode. Gate 5 of P-channel device 1 and gate 6 of N-channel device 2 are connected in parallel to a source of pulsed voltage labeled IN in FIG. 1. The source of device 1 is connected to a phase line 7 otherwise labeled $\phi$ and the source of device 2 is connected to another phase line 8 otherwise labeled $\bar{\phi}$ in FIG. 1. Node 9 disposed between diodes 3 and 4 provides a signal to an output circuit OUT in FIG. 1 which may be, as will be seen hereinafter, the gate terminals of a circuit similar to the one just described or to logic circuits which are activated by digital outputs.

Figure 1A:
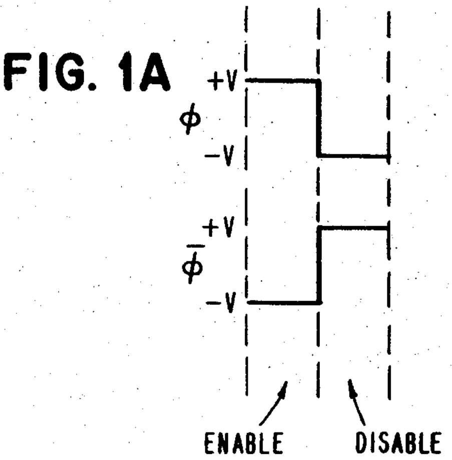
FIG. 1A shows waveforms of the voltages applied to phase lines $\phi$ and $\bar{\phi}$ during ENABLE and DISABLE portions of a given cycle.

Referring now to FIG. 1A, pulsed waveforms are shown which are utilized to enable and disable the circuit arrangement of FIG. 1. Assume for purposes of exposition that a positive pulse of sufficient amplitude is applied to gates 5 and 6 of field effect transistors 1, 2 via input IN. Under such circumstances, N-channel field effect transistor 2 is rendered conducting while P-channel field effect transistor 1 is rendered non-conducting when the waveforms entitled ENABLE in FIG. 1A are simultaneously applied to phase lines $\phi$ and $\bar{\phi}$. Because N-channel device 2 is conducting, node 9 is connected to the potential of phase line $\bar{\phi}$ which is at the potential −V and node 9 is simultaneously isolated from phase line $\phi$ which is at the potential +V by P-channel device 1 which is in the OFF or non-conducting condition. It should be noted that under the circumstances just indicated, that the circuit arrangement of FIG. 1 operates as a normal complementary inverter providing at its output the inverse of what was provided at the input. Thus, when phase line $\phi$ is at a positive potential +V and phase line $\bar{\phi}$ is at a negative potential −V, the circuit arrangement of FIG. 1 is in an ENABLE condition.

If a negative voltage of sufficient amplitude is applied on gates 5 and 6 via pulsed source IN, P-channel device 1 is rendered conducting and N-channel device 2 is rendered non-conducting. Under these circumstances, output node 9 is isolated from phase line $\bar{\phi}$ by OFF device 2 but is connected to phase line $\phi$ via conducting device 1 and forward biased diode 3. Thus, a negative potential which is applied to IN during the ENABLE condition as shown in FIG. 1A appears at node 9 as a positive voltage. Again, the circuit of FIG. 1 acts as a normal complementary inverter.

The circuit of FIG. 1 is then switched to a DISABLE condition by applying the waveforms entitled DISABLE shown in FIG. 1A to phase lines $\phi$ and $\bar{\phi}$. Thus, a negative potential −V is applied to phase line $\phi$ and a positive potential +V is applied to phase line $\bar{\phi}$. Under these circumstances, regardless of which of devices 1 and 2 is conducting, both diodes 3 4 are placed in a backward biased condition and no conduction path is present between node 9 and either of the phase lines and only leakage currents may flow in backward biased diodes 3, 4. Under such circumstances, the potential on node 9 is effectively isolated from the input and remains the potential which existed thereon just prior to the application at the DISABLE waveforms; it is independent of the condition of the input and, as will be seen hereinafter, may be applied to the gate electrodes of a similarly arranged circuit to that shown in FIG. 1. The output potential is also independent of the potentials on the phase lines.

From what has just been described in connection with FIG. 1, it should be apparent that by simply inverting the circuit of FIG. 1 such that N-channel device 2 is connected to phase line 7 or $\phi$ and P-channel device 1 is connected to phase line 8 or $\bar{\phi}$, that a similar inverter is provided except that what was the ENABLE cycle for the circuit of FIG. 1 becomes the DISABLE cycle and what was the DISABLE cycle for the circuit of FIG. 1 becomes the ENABLE cycle for the inverted circuit. It should also be apparent that when an inverter is enabled, the diodes of each inverter are arranged relative to their associated field effect transistors such that they are in a conductive state. Conversely, when any inverter is disabled, the diode associated with the conductive FET is backward biased or is in a non-conductive condition. These statements will become clearer during the discussion of a dynamic shift register arrangement incorporating a pair of such circuits per stage which is described hereinbelow in conjunction with FIG. 2.

Figure 2:
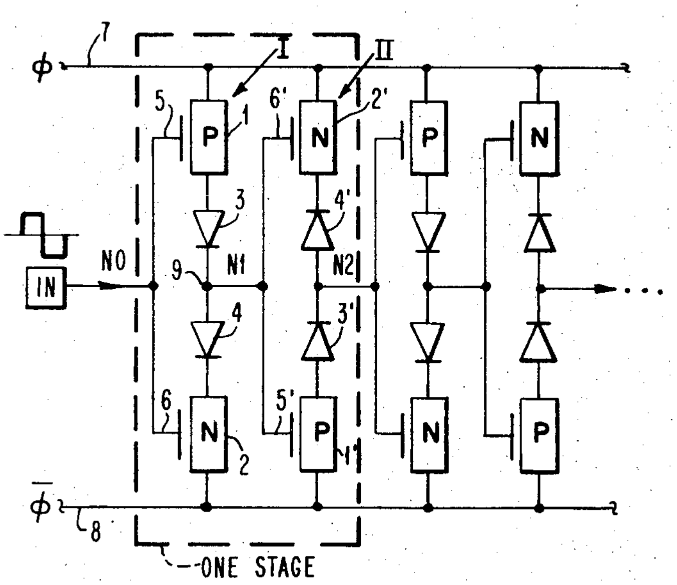
FIG. 2 is a schematic diagram of a shift register operable in a dynamic mode which incorporates inverter circuits of the type shown in FIG. 1. A shift register stage is formed from two inverters one of which is reversed in position relative to the other so that an ENABLE cycle for one inverter is a DISABLE cycle for the other inverter.

Referring now to FIG. 2 there is shown therein a dynamic shift register arrangement which incorporates in one stage of the shift register each of the types of circuits mentioned hereinabove in connection with the description of FIG. 1. In FIG. 2, I indicates a circuit identical with that shown in FIG. 1 hereinabove. II indicates a similar circuit except that the conducting direction of diodes 3′, 4′ is reversed from the conducting direction of diodes 3, 4 of the circuit arrangement indicated by I. In the circuit identified by II, devices which are the same as in the circuit identified by I have been indicated by the same reference number primed. Thus, the N-channel device of the circuit II is identified by the reference 2′ and the P-channel device is identified by the referenc number 1′. Thus a pair of circuits I, II form one stage of the dynamic shift register of FIG. 2. In FIG. 2, circuits I, II are shown surrounded by a dashed line and are otherwise identified therein by the title ONE STAGE. A plurality of identical stages are connected between phase lines $\phi$, $\bar{\phi}$ and may be cascaded to provide any desired length. In FIG. 2, circuit II is circuit I inverted and the ENABLE portion of the shift register cycle for circuit I is the DISABLE portion of the cycle for circuit II and, vice versa.

Figure 2A:
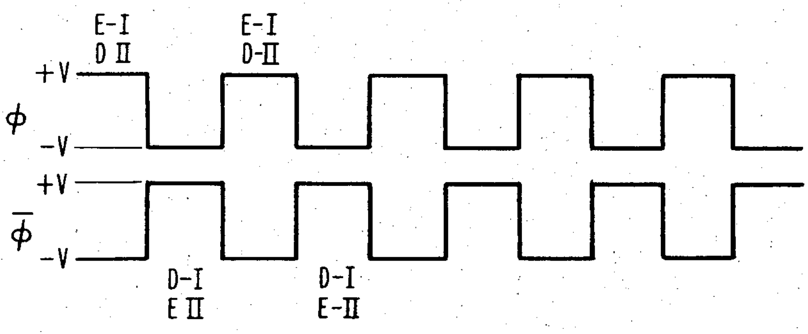
FIG. 2A shows the waveforms applied to phase lines $\phi$ and $\bar{\phi}$ which are utilized to shift information applied from a pulsed source from stage to stage of the shift register.

The waveforms shown in 2A are utilized to step information initially applied from a pulsed source labeled IN at node NO successively during an ENABLE-DISABLE cycle to nodes N1 and N2. Thus, in FIG. 2, one ENABLE-DISABLE cycle is required to shift information initially applied at NO to the output at N2. For example, in FIG. 2, a positive pulse applied to node NO via IN is shifted to N1, during an ENABLE portion of the shift register cycle, in the same manner described hereinabove in connection with the circuit of FIG. 1 and provides a negative signal on gates 5′, 6′ of field effect devices 1′, 2′. At the beginning of the DISABLE portion of the cycle for circuit I or the ENABLE portion for circuit II as shown by the caption D–I, E–II in FIG. 2A, a positive voltage is applied to phase line $\bar{\phi}$ and a negative voltage is applied to phase line $\phi$. The negative voltage on gate 5′ of P-channel device 1′ (from previous E–I, D–II in FIG. 2A) renders that device conducting and node N2 charges up to the potential of phase line $\bar{\phi}$ via conducting device 1′ and forward biased diode 3′. From the foregoing, it may be seen that the positive input at node N0 appears as a positive output at node N2. The fact to be appreciated from the foregoing is that by simply reversing the direction of diodes and the position of the FET devices in the circuit, an enabling potential for one circuit becomes a disabling potential for the other circuit. Thus, one circuit is simultaneously enabled while the other is disabled, effectively isolating the potentials on succeeding nodes from each other. It should be apparent that a negative pulse on IN provides a negative potential at the output node N2 of circuit II due to two inversions which occur in a manner similar to that described in connection with a positive pulse on IN.

As has been indicated hereinabove, the circuit arrangement shown in FIG. 2 is dynamic since information is retained on an isolated node from which charge may be dissipated due to the presence of leakage paths and must be continuously energized during successive ENABLE-DISABLE cycles to reatin information levels which are reduced due to leakage. In order to obviate this continuous cycling and to provide a DC stable or static shift register, the circuit of FIG. 2 may be modified by adding an additional inverter and a gated feed back path to statically store information within a shift register stage. This will become clear from the description of the circuit of FIG. 3 hereinbelow.

Figure 3:
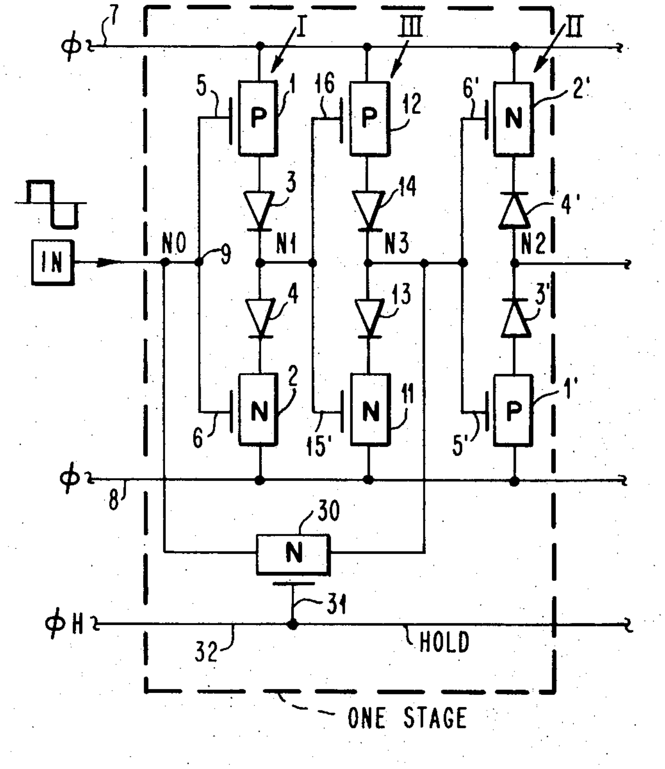
FIG. 3 is a schematic diagram of a shift register which is capable of operating in a static mode. In addition to the shift register stage of FIG. 2, FIG. 3 incorporates a third inverter which is identical with the first inverter of a given stage which during an ENABLE cycle has its output cross-coupled to the input of the first inverter via an actuable switching device interposed in a feedback path.

Referring now to FIG. 3, there is shown therein a modification of the basic shift register shown in FIG. 2 by which DC stable information retention is obtained. In the embodiment of FIG. 3, an extra inverter is used per stage which is enabled at the same time as the input inverter and can be cross-coupled with it to form a bistable circuit. In FIG. 3, cross-coupling is obtained by a series connected device which can be pulsed ON at the proper time.

In FIG. 3, portions thereof which are identical with the same portions in FIG. 2 have been labeled with the same reference characters.

Figure 3A:
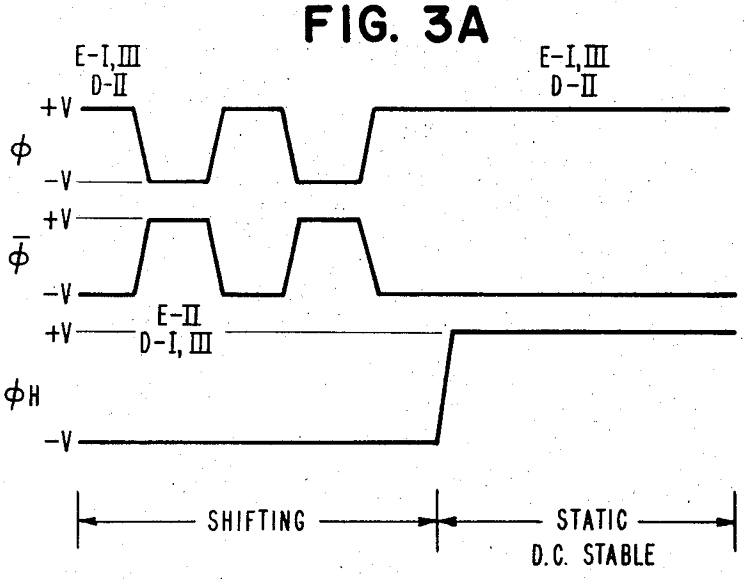
FIG. 3A shows the waveforms utilized in operating the shift register of FIG. 3 and those which are applied for statically retaining information in the shift register.

Referring now more specifically to FIGS. 3 and 3A, a circuit III which is interposed between circuits I, II is identical with circuit I and consists of field effect transistors 11 and 12 disposed in series with diodes 13 and 14. The gates 15, 16 of devices 11, 12, respectively, are connected in parallel with node N1 of circuit I. Node N3 which is disposed between diodes 13 and 14 is connected to gates 5′, 6′ of field effect transistors 1′, 2′, respectively, of circuit II. Node N3 is connected via N-channel field effect transistor 30 to node N0. The gate 31 of N-channel device 30 is connected to phase line 32 and otherwise designated as HOLD in FIG. 3 which is connected to a source of voltage (not shown) which provides a circuit waveform indicated as a $\phi$H in FIG. 3A.

In operation, circuit I of FIG. 3 operates (assuming a positive voltage on node N0 from pulsed source labeled IN) in the same manner described hereinabove as did the circuit I of FIG. 2. At the same time circuit I is enabled circuit III is enabled and a positive potential appears at node N3. Under such conditions, device 11 is rendered non-conducting while device 12 is rendered conductive and node N3 is charged up to the potential of phase line $\phi$ via conducting device 12 and forward biased diode 14. During the DISABLE portion of the shift register cycle, circuits I, III are disabled and circuit II is enabled as shown by the caption E–II, D–I, III in FIG. 3A. As a result of the positive voltage on gates 5′, 6′ of devices 1′, 2′ respectively, device 2′ is rendered conductive and device 1′ non-conductive. Under such circumstances, node N2 of circuit II is connected to the potential of phase line $\phi$ which, at that instant, is at a potential of —V. Thus, the circuit of FIG. 3 is capable of operating in a dynamic mode as long as the ENA- BLE-DISABLE potentials are applied to phase lines $\phi$ and $\bar{\phi}$ and as long as $\phi$H is at a potential which holds device 30 in the OFF or non-conducting state. However, conditions may arise where it is undesirable to continue in the dynamic mode. By applying ENABLE condition voltages to phase lines $\phi$ and $\bar{\phi}$ which are +V and −V volts, respectively, circuits I and III are simultaneously enabled while circuit II is disabled during the same interval. Under the circumstances where node N0 has a positive voltage thereon, node N1 has a negative voltage thereon, and node N3 has a positive potential thereon. When N-channel device 30 is rendered conductive by a positive voltage on its gate 31 via phase line 32 and otherwise indicated as HOLD in FIG. 3, the positive potential on node N3 is effectively cross-coupled to node N0 holding circuit I in a condition which maintains a negative voltage on node N1 which in turn maintains a positive voltage on node N3. In this manner, the circuit of FIG. 3 is maintained in a static condition for an interval which is as long as desired and until shifting of information is once more necessary. When the potential on phase line HOLD is changed to −V, N-channel device 30 is rendered non-conductive and phase lines $\phi$ and $\bar{\phi}$ have potentials applied thereto which render circuits I, III disabled and circuit II enabled. Under such circumstances, the potential at node N3 is held at a positive potential causing device 2' to conduct and device 1' to turn OFF placing a negative potential at node N2 which may be utilized to apply that potential to a pair of gates on the next succeeding circuit I. While the static condition has only been discussed in connection with one stage of a shift register, it should be obvious that each stage utilizes the same circuitry and that all similar N-channel devices 30 are connected in parallel with phase line HOLD so that the static condition is attained simultaneously in all stages of the shift register.

Figure 4:
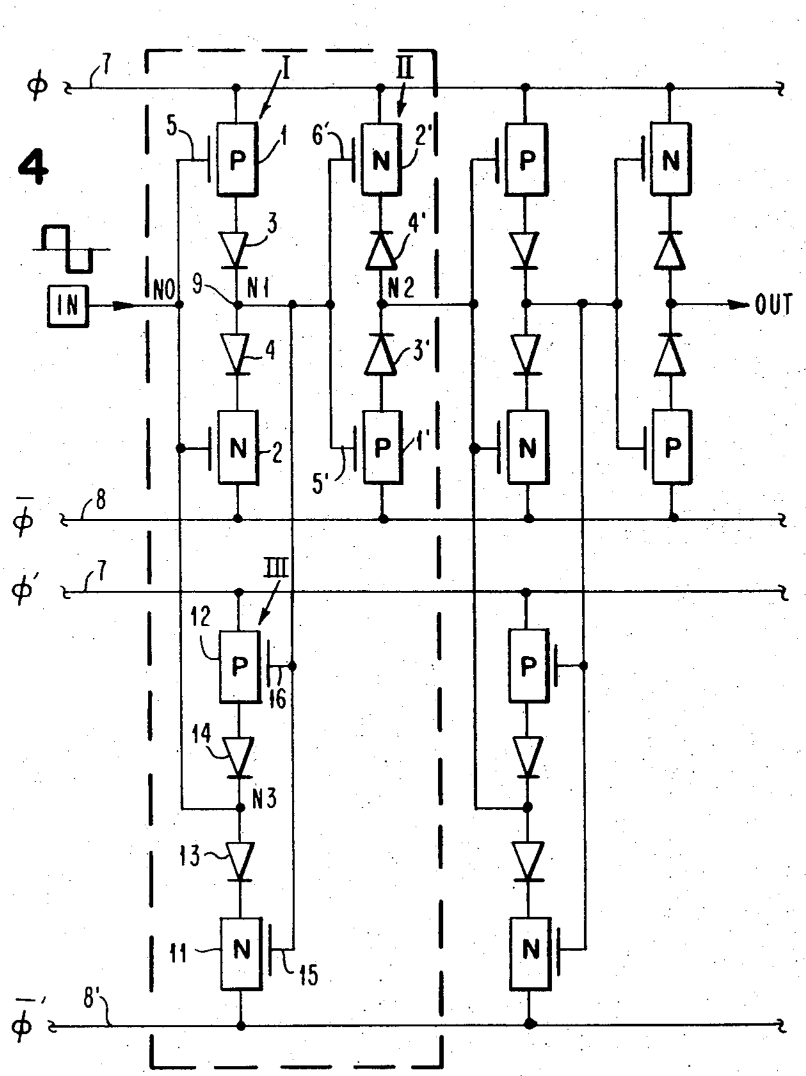
FIG. 4 is a schematic of another embodiment of the present invention which is operable in a static mode. This embodiment incorporates an additional inverter which is separately actuated from separate phase lines to apply the output of the additional inverter to the input of the first inverter of a shift register stage.
Figure 4A:
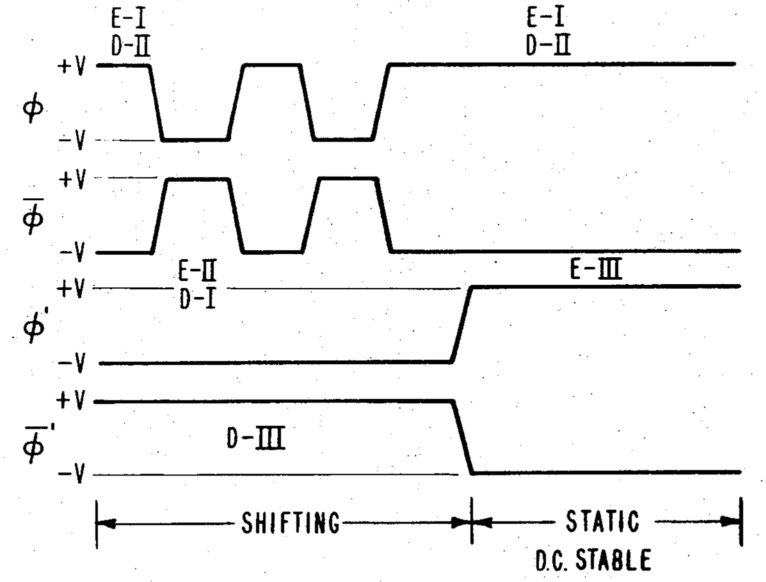
FIG. 4A shows the waveforms utilized in shifting information applied at an input from one stage to a succeeding stage and also shows the waveforms applied for operating the shift register of FIG. 4 in a static mode.

FIG. 4 shows another embodiment of a shift register which is DC stable and which incorporates per shift register stage a separately actuated inverter III, the node N3 of which is directly coupled to node N0. FIG. 4A shows the waveforms applied to phase lines $\phi$ and $\bar{\phi}$ and those potentials applied to phase lines $\phi'$ and $\bar{\phi}'$. During normal shifting applying the SHIFTING potentials to phase lines $\phi$ and $\bar{\phi}$, information applied at N0 via pulsed source labeled IN is passed through the shift register of FIG. 4 to N2 in exactly the same manner described in connection with the operation of FIG. 2. Note that circuits I, II, are identical with those shown in FIG. 2. However, where it is desired to hold the data statically in the shift register of FIG. 4, phase lines $\phi$ and $\bar{\phi}$ are maintained in their enabled state with voltages +V and −V applied on phase lines $\phi$ and $\bar{\phi}$, respectively. At the same time, circuit III which was maintained in a disabled condition during the SHIFTING mode by applying potentials −V and +V on phase lines $\phi'$ and $\phi'$, respectively, is changed to an ENABLE condition. When circuit III is enabled along with circuit I, (see captions E–I, III, D–II in FIG. 4A during static condition) the potential on node N1 is applied to gates 15, 16 of devices 11, 12, respectively. Assuming the potential of node N1 to be negative, and the potentials on phase lines $\phi'$, $\phi'$ to be +V, −V, respectively, device 12 is rendered conducting and device 11 non-conducting. Under these circumstances, node N3 is charged via conducting device 12 and forward biased diode 14 to the potential of phase line $\phi'$ which, at this instant, is at a positive potential +V. Because node N3 is connected to gates 5, 6 of devices 1, 2, respectively, of circuit I, the positive potential being fed back maintains devices 1, 2 in the same condition until shifting of information through the shift register of FIG. 4 is once again desired. Note in FIG. 4 that circuits I-III form one stage of the shift register and that each succeeding stage is identical with it. Thus, when the static mode is desired, all circuits III connected to phase lines $\phi'$, $\bar{\phi}'$ are actuated simultaneously and the condition of their associated circuits I, II is retained statically at the same time.

The circuits of FIG. 1–4 have the following advantages over other shift register arrangements as follows:

a. The FET devices utilized operate in a common source mode only.

b. Circuit transients pass through only a single FET in each inverter resulting in higher speed.

c. The series transmission gates which prior art complementary inverters use are eliminated resulting in less area and better performance.

d. The use of Schottky type diodes for the diodes of the circuits of FIGS. 1–4 results in relatively small per stage area requirements.

Since the method of fabrication of the circuits of FIGS. 1–4 described hereinabove forms no part of the present invention, no specific technique has been given for its fabrication. Suffice it to say that each of the arrangements of FIGS. 1–4 can be obtained by utilizing off the shelf commercially available field effect transistors and diodes. In the integrated circuit environment, a number of techniques may be utilized which incorporate the formation by diffusion of P and N conductivity type regions in which source and drain regions are ultimately formed. In one approach, Schottky barrier diode devices may be formed in series with source and drain diffusions by applying the proper contact material during metallization, minimizing the number of steps required to fabricate such circuits in an integrated circuit environment.

In connection with the circuits of FIGS. 1–4, it should be appreciated that the diodes utilized in each of the circuits need not be serially arranged between the field effect transistors, but may be connected between the phase lines and the field effect transistors without changing the operation of the shift registers in any way. Also, while nothing has been specifically stated in connection with the means for applying the waveforms of FIGS. 1A–4A, it should be appreciated that pulse generators capable of applying the waveforms shown are well known to those skilled in the electronics art and are commerically available.

On a practical level, the shift registers of FIGS. 1–4 can be activated using waveforms which have excursions between +5 and −5 volts and having input voltages which use the same voltage levels. These voltage levels are, of course, a function of the threshold voltage of the complementary transistors. Under such conditions, a 100mc shift rate can be anticipated with higher shifting rates available if one is willing to sacrifice minimum area and density requirements or utilize higher voltages.

In the foregoing discussions of FIGS. 1–4, only voltages of +V and −V have been indicated. It should be appreciated that other potentials may also be utilized without departing from the spirit and scope of the present invention. For example, the +V voltage need only be the more positive of the two voltage levels and the —V voltage the more negative. Thus, the circuits of FIGS. 1–4 may be operated using potentials of —V and ground potential and +V and ground potential.

While the invention has been particularly shown and described with reference to preferred embodiments, it will be understood by those skilled in the art that the foregoing and other changes in form and details may be made therein without departing from the spirit and scope of the invention.

What is claimed is:

1. An inverter having input and output terminals comprising:

a pair of complementary field effect transistors the gates of which are connected to said input and a pair of unidirectional devices disposed in series with said field effect transistors;

means connected to said inverter for simultaneously applying at least first and second pulsed potentials thereto to charge said output to one of said first and second potentials during a first portion of a given cycle; and, means connected to said inverter for simulataneously applying complementary potentials opposite to said first and second potentials thereto for holding the potential of said output to approximately one of said first and second potentials during a second portion of said given cycle.

2. An inverter according to claim 1 wherein said unidirectional devices are diodes.

3. An inverter according to claim 1 wherein said unidirectional devices are Schottky barrier diodes.

4. An inverter according to claim 1 wherein said means for applying at least first and second potentials includes a pulsed source connected to said input which applies one of a positive and negative potential to said input during said first portion of said given cycle.

5. An inverter according to claim 1 wherein said means for applying at least first and second potentials includes a pulsed source connected to said input which applies one of a positive and ground potential to said input during said first portion of said given cycle.

6. An inverter according to claim 1 wherein said means for applying at least first and second potentials includes a pulsed source connected to said input which applies one of a negative and ground potential to said input during said first portion of said given cycle.

7. An inverter according to claim 1 wherein said means for applying at least first and second potentials includes first and second pulsed sources which apply positive and negative potentials to said inverter during said first portion of said given cycle said first pulsed source applying a potential of opposite polarity to said second pulsed source at the same instant.

8. An inverter according to claim 1 wherein said means for applying at least first and second potentials includes first and second pulsed sources which apply positive and ground potentials to said inverter during said first portion of said given cycle said first pulsed source applying a potential of opposite polarity to said second pulsed source at the same instant.

9. An inverter according to claim 1 wherein said means for applying at least first and second potentials includes first and second pulsed sources which apply negative and ground potentials to said inverter during said first portion of said given cycle said first pulsed source applying a potential of opposite polarity to said second pulsed source at the same instant.

10. An inverter according to claim 1 wherein said means for holding includes pulsed sources connected to said inverter which apply the potentials complementary to those applied during the first portion of the given cycle to said inverter during said second portion of said given cycle.

11. An inverter according to claim 1 wherein said complementary field effect devices are enhancement mode devices.

* * * * *